March 31. 1925.
C. M. HARRISON
PORTABLE ELECTRIC HAND SAW
Filed May 29, 1923
1,531,930
2 Sheets-Sheet 1
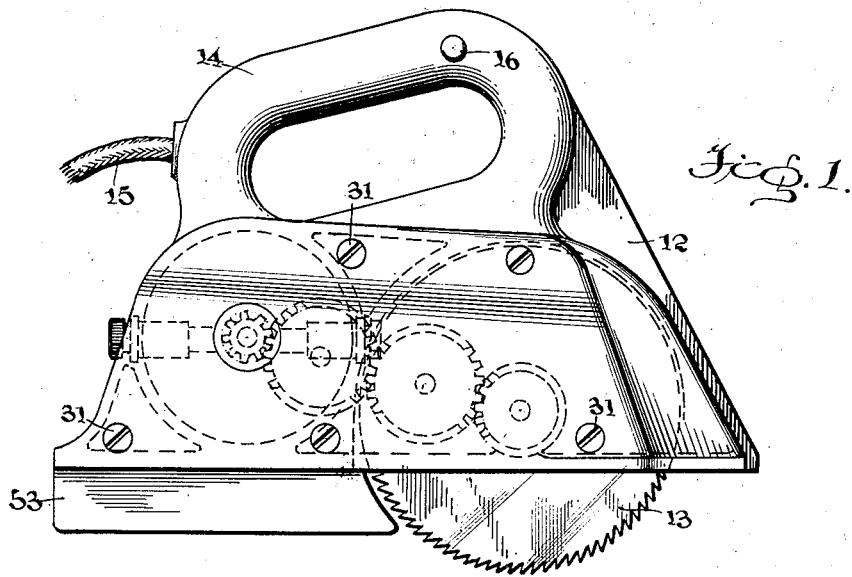
Fig. 1.
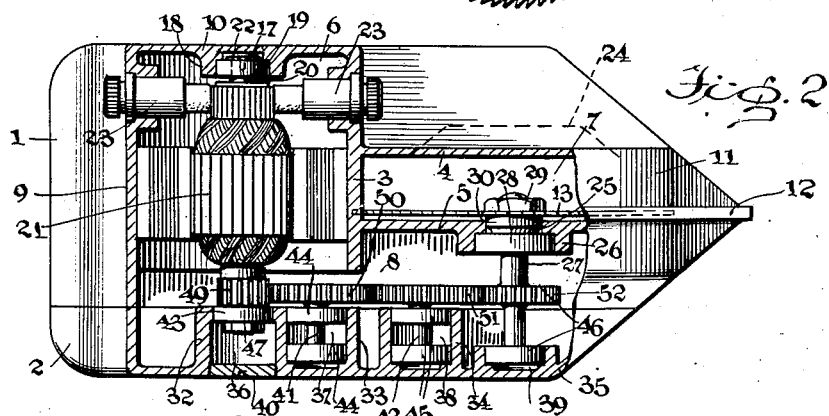
Fig. 2.
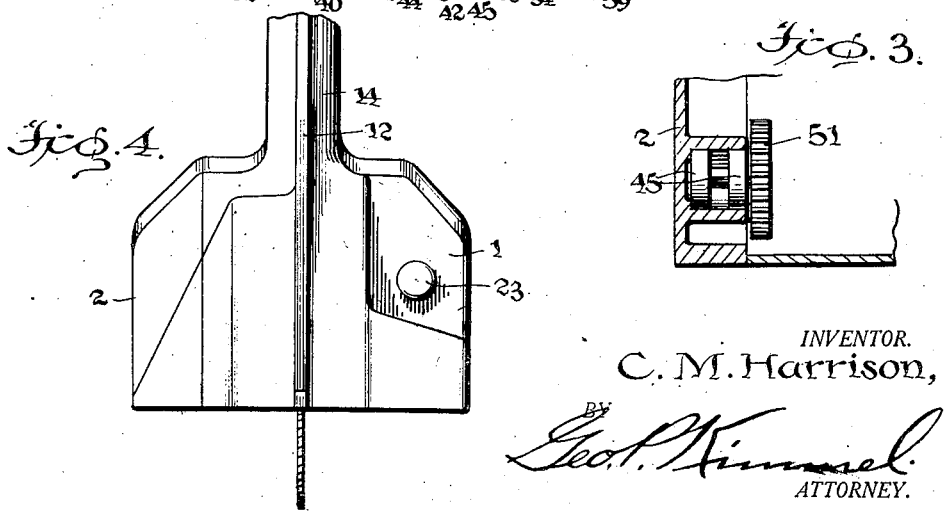
Fig. 4.
Fig. 3.
INVENTOR.
C. M. Harrison,
BY Geo. P. Kimmel
ATTORNEY.

March 31, 1925.  
C. M. HARRISON  
1,531,930
PORTABLE ELECTRIC HAND SAW
Filed May 29, 1923  2 Sheets-Sheet 2
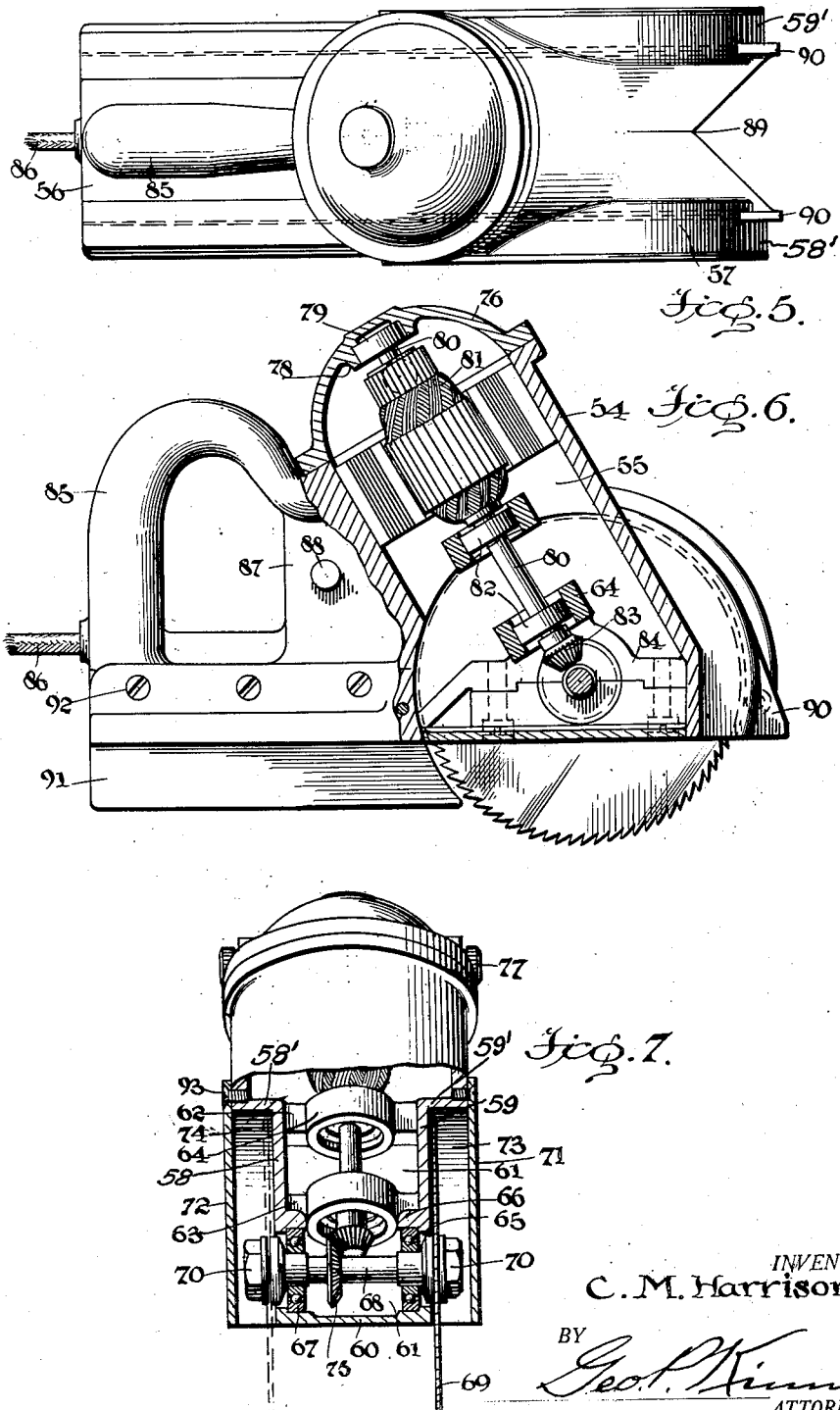
INVENTOR.
C. M. Harrison,
BY
Geo. P. Kimmel
ATTORNEY.

Patented Mar. 31, 1925.

1,531,930

UNITED STATES PATENT OFFICE.

CHARLES M. HARRISON, OF BALTIMORE, MARYLAND.

PORTABLE ELECTRIC HANDSAW.

Application filed May 29, 1923. Serial No. 642,227.

*To all whom it may concern:*

Be it known that I, CHARLES M. HARRISON, a citizen of the United States, residing in the city of Baltimore and State of Maryland, have invented certain new and useful Improvements in a Portable Electric Handsaw, of which the following is a specification.

This invention relates to a portable electric hand saw, and has for its object to provide, in a manner as hereinafter set forth, a saw of such class with means whereby all the movable parts thereof, except the projecting portion of the saw blade necessary to do the cutting, are entirely inclosed within a suitable housing and further setting up a housing to provide a separate compartment for the saw blade so that the dirt and sawdust are kept away from the driving means for the saw blade.

A further object of the invention is to provide a saw of such class, in a manner as hereinafter set forth, with means to insure a true, straight saw cut, as well as to prevent lateral movement of the saw during the cutting operation and further to greatly assist the operator in guiding the saw straight.

A further object of the invention is to provide a portable electric hand saw, in a manner as hereinafter set forth, whereby the blade can be shifted for the purpose to accommodate work in close corners.

A further object of the invention is to provide a portable electric hand saw, in a manner as hereinafter set forth, not only including a guiding element traveling in the saw kerf, but further to provide the saw with a sight element to enable the accurate following of the cutting line provided on the work to be operated on.

Further objects of the invention are to provide a portable electric hand saw which is simple in its construction and arrangement, strong, durable, efficient and convenient in its use, compact, readily assembled, and comparatively inexpensive to set up.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of an electric hand saw in accordance with this invention.

Figure 2 is a top plan view, broken away.

Figure 3 is a fragmentary view, in section.

Figure 4 is a front view.

Figure 5 is a top plan of a modified form.

Figure 6 is a side elevation, partly in section, of the form shown in Figure 5.

Figure 7 is a front elevation, partly in section, of the form shown in Figure 5.

Referring to Figures 1 to 4 of the drawings, a portable electric hand saw in accordance with this invention comprises a housing formed of two sections 1, 2. Section 1 is of greater width than the section 2, and said section 1 is provided with partitions 3, 4 and 5. The partition 3 extends transversely of the section 1 and provides a motor chamber 6. The partitions 4, 5 are integral with the partition 3, are disposed longitudinally of the section 1, and provide a saw blade chamber 7, and a driving gear chamber 8 into the rear end of which opens the motor chamber 6. The rear wall of the section 1 is indicated at 9, the side wall at 10 and the front wall at 11. The front wall 11 of the section 1 has a projection 12, which is positioned centrally of the housing of the machine, and which provides a sight adapted to register with the cutting line placed on the work to be operated on. Using the sight 12 enables the operator to accurately follow the cutting line and when the machine is set up, the saw blade, which is indicated at 13, is in alignment with the sight 12.

Formed integral with the top of the section 1, is a hollow handle 14 into which extend the leading-in wires 15, and said handle 14 is provided with a conventional switch 16, in convenient reach of the operator so that a means is provided for closing and opening a motor circuit to cause the operation of the saw blade 13 when occasion so requires. The projection 12 which constitutes a sight, extends from the forward end of the handle 14, to the bottom of the housing, as illustrated in Figures 1 and 4. The side wall 10, of section 1, at the rear thereof, is provided with an inwardly extending integral hub 18, shouldered on its inner face, as at 17, and seated against said shoulder 17 is a bearing element 19 for the shaft 20 of an electric motor 21, which is arranged within the chamber 6 and is disposed transversely with respect to the section 1. A securing element 22 is mounted on the outer end of the shaft 20.

Oppositely disposed brushes 23 are carried by the partition 3 and rear wall 9. The leading-in wires 15 are suitably connected with the brushes 23, although the circuit arrangement is not shown, yet it is obvious that the leading-in wires can be extended through the handle 14 and into the chamber 6 and connected with the brushes 23. The partitions 3 and 5 separate the motor chamber 6 from the saw blade chamber 7 so that sawdust and dirt are prevented from entering the chamber 6. The partition 4, which in connection with the partition 5 provides the saw blade chamber 7, is a part of the forward portion of the side wall 10 of the section 1, and the bottom of the section 1, as well as said partition 4 is cut away, as indicated in dotted lines, at 24, Figure 2, to provide an opening for removing the saw blade 13 when occasion so requires.

The partition 5 is formed with an opening 25 and is also formed with an integral hub 26, which surrounds and is of greater diameter than the opening 25. Extending through the opening 25 and hub 26, is a saw blade operating shaft 27, which carries a bearing element 28 arranged in the hub 26. The shaft 27 projects through the saw blade 13 and carries a securing nut 29, and said shaft 27 is enlarged, as at 30 and between said enlargement 30 and the securing nut 29, is arranged the saw blade 13. The nut 29 and enlargement 30 provide means for fixedly securing the blade 13 to the shaft 27. The hub 26, which is an integral part of the partition 5, extends into the chamber 8 and also extending transversely of the chamber 8 is the motor shaft 20, as well as the saw blade shaft 27.

The section 2 is detachably secured to one side of the section 1, by the removable holdfast devices 31, and which when in position forms a continuation of the chamber 8, as well as the outer side wall of said chamber. The forward end of the section 2 forms a continuation of one side of the front of the section 1 and the rear end of the section 2 forms a continuation of the rear end of the section 1. The inner face of the side of the section 2, has formed integral therewith inwardly extending cylindrical hubs 32, 33 and 34 and an inwardly extending annular boss 35. The hub 32 provides a socket 36, the sleeve 33 provides a socket 37, the hub 34 provides a socket 38, and the boss 35 a socket 39. The hubs 32, 33 and 34 are of greater length than the boss 35. The socket 36 formed by the hub 32 is open at each end, but has its outer end closed through the medium of a closure disk 40 which detachably engages with the section 2. The outer end of the sockets 37, 38 and 39 are closed, but the inner ends thereof are open. The axis of the socket 36 is arranged above the axis of the socket 37, the axis of the socket 37 is arranged above the axis of the socket 38, and the axis of the socket 38 is arranged above the axis of the socket 39. The sockets 36, 37, 38 and 39 preferably are of the same diameter.

The motor shaft 20 extends into the inner end of the socket 36 and the saw blade driving shaft 27 extends into the socket 39. Extending into the socket 37 is a shaft 41, and extending into the socket 38 is a shaft 42. The shaft 20 carries a bearing element 43, which engages with the wall of the socket 36. The shaft 41 carries a pair of bearing elements 44 which engage the wall of the socket 37. The shaft 42 carries a pair of bearing elements 45 which engage the wall of the socket 38, and the shaft 27 carries a bearing element 46 which engages the wall of the socket 39. Mounted on the shaft 20, within the socket 36, is a securing nut 47.

That end of the shaft 20 which extends into the chamber 8 is provided with a pinion 49, meshing with a gear 50 carried by the shaft 41, exteriorly of the socket 37. The shaft 42 carries a gear 51, which meshes with the gear 50 and said gear 51 is arranged exteriorly of the socket 38. The shaft 27 is provided with a gear 52 which meshes with the gear 51. The pinion 49, gears 50, 51 and 52 constitute a driving means for the shaft 27 for the purpose of operating the saw blade 13.

The section 1 of the housing is provided with a depending guide blade 53, which is arranged centrally of the housing and in alignment with the saw blade 13. The guide blade 53 is immediately back of the blade 13 and the guide blade follows up the saw blade in the saw kerf thereby preventing lateral movement and will greatly assist the operator in guiding the saw straight.

Referring to Figures 5 to 7 of the drawings, the housing comprises a main section, a pair of auxiliary sections, and a cap member. The main section is formed, intermediate its ends, with a rearwardly inclined cylindrical portion 54 which provides a motor chamber 55. The top of the rear portion of the main section, indicated at 56, is of less width than the top of the forward portion of the main section, indicated at 57. The forward portion of the main section includes a pair of side walls 58, 59, and the former is provided throughout with an outwardly extending flange 58' and the latter throughout with an outwardly extending flange 59'. The flanges 58', 59' extend in opposite directions and at right angles to the side walls 58, 59. Formed integral with the lower ends of said walls 58, 59, is the bottom 60 and the latter in connection with the side walls 58, 59, provide a driving gear chamber 61. Formed integral with the side walls 58, 59 and extending across the chamber 61, is a pair of brace members 62, 63, one arranged above the other and each of which has formed centrally thereof a collar 64. Each of the side walls 58, 59, near the lower end thereof, is provided with an opening 65, and each of said side walls has its inner face provided with an integral hub 66 which surrounds an opening 65 and is of greater diameter than the diameter of the opening. The hubs 66 are oppositely disposed and extend into the chamber 61.

Mounted in each of the hubs 66 is a bearing element 67, carrying a saw blade driving shaft 68 which extends transversely of the chamber 61 and further through the openings 65. The saw blade is indicated at 69 and which is detachably secured to one end of the shaft 68, by washers and a securing nut, indicated generally by the reference character 70.

The auxiliary sections are indicated at 71, 72, and which are positioned against the flanges 58', 59', and further are removably secured to the extension 54 by the hold-fast devices 93. The auxiliary sections 71, 72, in connection with the side walls 58, 59, and the flanges 58', 59' provide a pair of saw blade chambers 73, 74, and in either one of said chambers the saw blade 69 can be positioned for operation. The shaft 68 extends into the said chambers 73, 74 and the securing nuts are arranged on the ends of the shafts 68 within the chambers. The shaft 68 within the chamber 61 carries a bevelled gear 75.

The chamber 55 is closed by a removable cap member 76, which has the brushes 77 connected therewith. The inner face of the cap member 76 is provided with a boss 78, in which is arranged the bearing element 79, carried on the upper end of the shaft 80 of the motor 81. The motor 81 is positioned within the chamber 55, and the shaft 80 thereof extends through the collars 64, carried by the cross braces 62, 63. Mounted on the shaft 80 and arranged within the collars 64 are bearing elements 82, and said shaft 80 below the collar 64 on the cross brace 63 is provided with a bevelled pinion 83, which meshes with the bevelled gear 75.

The collars 64 and boss 78 are disposed at an inclination, the inclination being upward and rearward, so that the shaft 80 and motor 81 will be supported at an inclination in the manner as clearly shown in Figure 6.

Bearings 84 are arranged on the bottom 60 of the main section of the housing at the lower portion of the chamber 61.

Formed integral with the rear portion of the main section of the housing and also with the cylindrical portion 54 is a hollow handle 85 into which extends the leading-in wires 86, and these latter are connected in a known manner with the brushes 77. The rear portion of the main section of the housing has a vertical extension 87, in which is arranged a switch 88, to provide for the convenient closing and opening by the operator of the motor circuit when occasion so requires.

The forward end of the housing, or rather the main section of the housing is V-shaped, as indicated at 89, and the said forward end is furthermore provided with inclined projections 90, which constitute sights and each of the sights 90 is arranged so as to be in alignment with a blade 69 when it is positioned within a saw blade compartment so that when the saw is operated, the operator, through the medium of a sight 90, can accurately follow the cutting line placed on the work to be operated on.

In order to secure a true straight saw cut, a guide 91 is provided and which is inserted in the housing directly in line with and immediately back of the saw blade 69. The guide 91 will follow up the saw blade in the saw kerf, thereby preventing lateral movement and greatly assist the operator in guiding the saw blade straight. The guide 91 is transferred from side to side depending on which side of the housing the blade 69 is employed. The rear of the housing is formed with suitable slots for the reception of the guide 91, and said guide 91 is detachably secured in position by the hold-fast devices 92.

As is apparent, the saw blade may be used in either of the two positions shown to accommodate working in close corners. To change the saw blade from one position to the other, it is necessary to detach the auxiliary sections 71 and 72 by removing the securing means therefor as indicated at 93.

After the sections 71 and 72 have been removed, the saw blade 69 is then disconnected from one end of the shaft 68, and then secured in position on the other end. The clamping means for the saw blade 68 necessarily will be one right hand threaded and the other left hand threaded so that they will tend to tighten up the saw blade when it is being used. The saw blade 68 can be shifted from side to side at will, but the shaft of the saw blade 68 remains in its bearings so that no misalignment can occur due to carelessness in changing the saw blade. Other means than that as shown for connecting the auxiliary sections 71 and 72 to the main section can be employed.

It is of course, understood that a saw, set up in the manner as hereinbefore referred to, will require a suitably designed motor arranged with the ball bearings so proportioned and disposed as to absorb the end thrust due to the weight of the motor and the side thrust resultant from the bevelled gear drive. The motor is shown inclined at an angle of thirty degrees to the vertical center and this mounting puts most of the weight over the saw which is a very desirable condition. It also permits the saw to be compactly arranged and minimizes the number of driving parts.

The setting up of the housing in the manner as stated, provides for the positioning of the saw blade in a chamber or compartment, which is separated from the driving means for the blade, as well as separated from the operating means for the driving means, and under such conditions, the driving means, as well as such operating means is protected from dirt and sawdust.

It is understood that satisfactory means for the lubrication of all bearings will be provided, also that all ball bearings will be mounted in an approved manner, those adjacent to the saw chambers being provided with felt washers on sides nearest the saw chambers to effectually exclude all fine particles of foreign matter from the chambers in which are located the driving means for the saw.

Although the preferred embodiment of the invention is as described and illustrated, yet it is to be understood that changes in the details of construction can be had which will fall within the light of the invention as claimed.

What I claim is:—

A portable electric hand saw comprising a housing having an integral portion thereof constituting a handle, said housing further provided at its front with an inclined projection extending forwardly therefrom and constituting a sight, a saw blade mounted within and depending from the housing and arranged in alignment with said sight, and a controllable electrically operated driving mechanism operatively connected with the blade for driving it.

In testimony whereof, I affix my signature hereto.

CHARLES M. HARRISON.